U. PAGE.
PRESS FOR PRESSING COTTON OR HAY.

No. 104,991.  Patented July 5, 1870.

Witnesses:
A. W. Almqvist
Edgar Tate

Inventor:
U. Page
Per ——— Attorneys.

United States Patent Office.

URIAH PAGE, OF RINGGOLD, LOUISIANA.

Letters Patent No. 104,991, dated July 5, 1870.

IMPROVED PRESS FOR PRESSING COTTON OR HAY.

The Schedule referred to in these Letters Patent and making part of the same.

*To all whom it may concern:*

Be it known that I, URIAH PAGE, of Ringgold, in the parish of Bienville and State of Louisiana, have invented a new and improved Cotton and Hay-Press; and I do hereby declare that the following is a full, clear, and exact description thereof, which will enable others skilled in the art to make and use the same, reference being had to the accompanying drawing forming part of this specification.

My invention relates to hay and cotton-presses, and consists in the construction, arrangement, and combination of parts which form the mechanism for operating the follower.

Similar letters of reference indicate corresponding parts.

A is the vertical frame, and

Figures 1, 2:
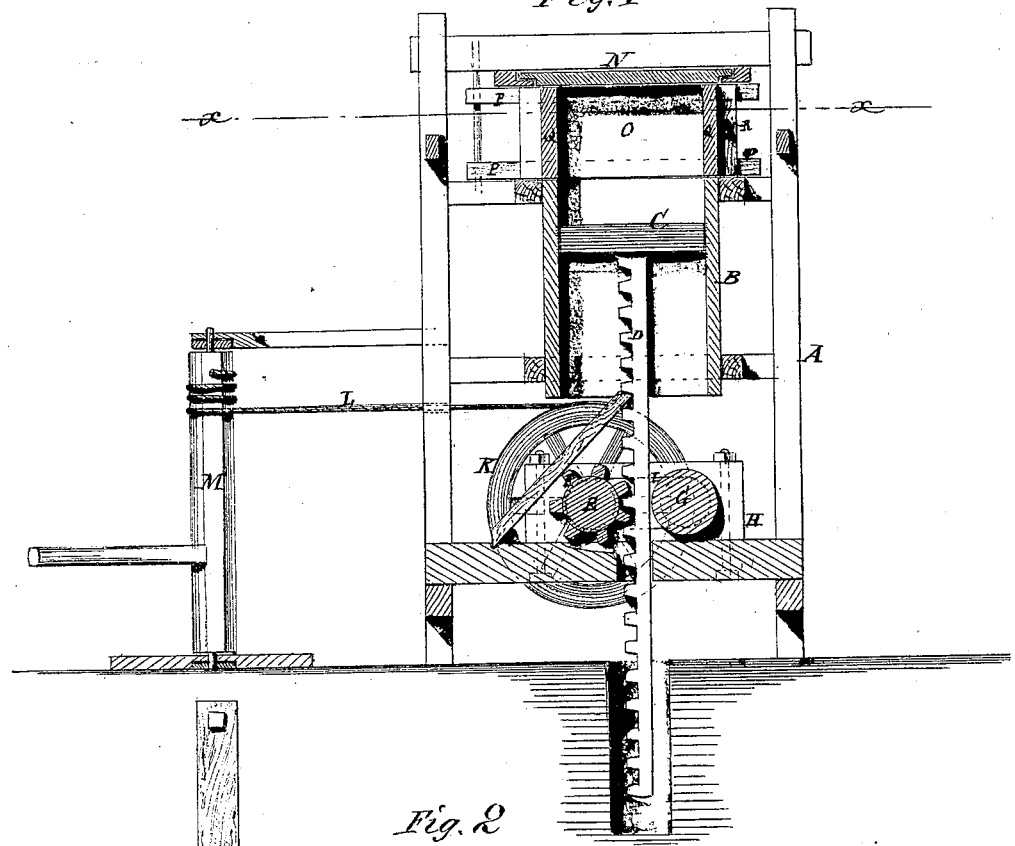
Figure 1 is a sectional elevation of my improved press.
Figure 2 is a horizontal section of the same.

B the pressing-case, arranged in the upper part thereof.

C is the follower, and

D the stem for working it.

This stem has gear-teeth on one side, in which the driving-pinion E on the the shaft F works, and on the side of the said stem opposite the teeth is a presser-roller, G, to hold it in gear with the pinion.

This pinion is cast solid with the shaft F, for economy of construction, and for the same reason the bearings H, for this shaft and the journals of the roller G, are cast in two parts, with long recesses in the faces, which come together when placed in position, forming the slots I, the walls of which, at the ends, form the bearings for the said journals. The two parts, after receiving the journals, are clamped down upon the bed by bolts and nuts.

The shaft F is provided, at one end, with a drum, K, for operating it, by a rope, L, wound thereon, and connected to a horse, hand, or other power, M, by which great force may be imparted to the said follower.

The top N or roping-board of the packing-case is arranged to slide under the upper cross-beams of the frame, for ready removal for applying the bagging or canvas.

The sides O O' of that part into which the bale is pressed are hinged, at P, to swing open, also for applying the bagging, and for removing the bale; and the end boards Q are held in recesses in the sides of the parts O O', which are held in the closed position by the hasp K, hinged to one, and catching on the other, in any suitable way.

The side O' is opened for filling the case, or it may be filled through the top when the board N is removed.

The follower may be held up by a pawl, T, resting on the bed, and catching in the teeth.

Having thus described my invention,

I claim as new and desire to secure by Letters Patent—

The combination of rack D, pinion E, and friction-roll G, with the long slotted sectional bearings H, as and for the purpose described.

URIAH PAGE.

Witnesses:
  Z. THOMAS,
  J. M. LOCKETT.